United States Patent
Hoshina

(10) Patent No.: US 10,268,535 B2
(45) Date of Patent: Apr. 23, 2019

(54) VEHICULAR IMAGE DISPLAY SYSTEM

(71) Applicant: TOYOTA JIDOSHA KABUSHIKI KAISHA, Toyota-shi, Aichi-ken (JP)

(72) Inventor: Takeshi Hoshina, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 142 days.

(21) Appl. No.: 15/451,857

(22) Filed: Mar. 7, 2017

(65) Prior Publication Data

US 2017/0262339 A1 Sep. 14, 2017

(30) Foreign Application Priority Data

Mar. 10, 2016 (JP) ................................ 2016-046945

(51) Int. Cl.
| | |
|---|---|
| G06F 11/07 | (2006.01) |
| B60K 35/00 | (2006.01) |
| G09G 5/00 | (2006.01) |
| G09G 5/14 | (2006.01) |
| G09G 5/36 | (2006.01) |

(52) U.S. Cl.
CPC .......... G06F 11/0739 (2013.01); B60K 35/00 (2013.01); G09G 5/00 (2013.01); G09G 5/14 (2013.01); G09G 5/363 (2013.01); B60K 2350/352 (2013.01); G09G 2310/04 (2013.01); G09G 2360/18 (2013.01)

(58) Field of Classification Search
CPC ............. G06F 11/0739; G06F 11/1608; G06F 11/1629; G06F 11/1637; G06F 11/1641
See application file for complete search history.

(56) References Cited

U.S. PATENT DOCUMENTS

| | | | |
|---|---|---|---|
| 8,433,955 B2 * | 4/2013 | Yamada | G06F 11/004 714/48 |
| 8,819,483 B2 * | 8/2014 | Pierce | G06F 11/1438 714/10 |
| 2008/0297436 A1 | 12/2008 | Oikawa et al. | |
| 2015/0220383 A1 | 8/2015 | Saito | |

FOREIGN PATENT DOCUMENTS

| | | |
|---|---|---|
| JP | 595510 A | 4/1993 |
| JP | 2008300983 A | 12/2008 |
| JP | 2011090597 A | 5/2011 |
| JP | 2012044400 A | 3/2012 |
| JP | 2015-131635 A | 7/2015 |
| JP | 2015-144391 A | 8/2015 |

* cited by examiner

Primary Examiner — Joseph R Kudirka
(74) Attorney, Agent, or Firm — Sughrue Mion, PLLC

(57) ABSTRACT

A vehicular image display system includes: an image writing control part that writes first image data generated by a first application operating under a first operating system sequentially in image storage parts by switching of the image storage parts; an image reading control part that reads the first image data from the image storage parts sequentially by switching of the image storage parts; a display data generation part that combines the first image data and second image data generated by a second application operating under a control of a second operating system with higher reliability than the first operating system; an error detection part that checks the first image data; and a switching control part that suspends the switching of the image storage parts by the image writing control part and by the image reading control part, when an error is detected.

14 Claims, 7 Drawing Sheets

VEHICULAR IMAGE DISPLAY SYSTEM

INCORPORATION BY REFERENCE

The disclosure of Japanese Patent Application No. 2016-046945 filed on Mar. 10, 2016 including the specification, drawings and abstract is incorporated herein by reference in its entirety.

BACKGROUND

1. Technical Field

The disclosure relates to a vehicular image display system.

2. Description of Related Art

Japanese Patent Application Publication No. 2015-144391 (JP 2015-144391 A) discloses an image data transmission method (system) in which image data that are generated by an image processor are transmitted from a transmitting circuit to a receiving circuit by a serial transmission protocol. In this system, the image data that are received by the receiving circuit are first stored in a received pixel buffer, and the transmitting circuit determines whether or not there is a transmission error with reference to an error detecting code that has been previously set in the image data. Then, the image data that are determined to have no error are retained in a correction buffer. In the event of an error, the image data that have been retained in the correction buffer are used to correct the image data. This improves the reliability in outputting received image data to a display device for display thereon.

SUMMARY

In recent years, a technology for displaying image data that are generated by at least two applications that operate under the control of operating systems with different reliability from each other, such as image data that are generated by an information-oriented application that is executed by, for example, a car navigation system or agent system and image data that are generated by a control-oriented application that is executed by, for example, a controller that is directly involved in the traveling of the vehicle, such as a speed meter, on a common display screen in an overlaid fashion is proposed as a new form of image display in vehicles. Such a case, however, is not preferred because an error that occurs in image data that are generated by the information-oriented application with relatively lower reliability may adversely affect the image display by the control-oriented application with relatively higher reliability.

The present disclosure provides a vehicular image display system that, in displaying image data that are generated by at least two applications that operate under the control of operating systems with different reliability from each other in an overlaid fashion, can continuously display image data that are generated by an application that operates under the control of an operating system with relatively higher reliability.

A first aspect of the disclosure provides a vehicular image display system configured to display image data. The image data is generated by in-vehicle applications and is displayed in an overlaid fashion on a common display device mounted in a vehicle. The vehicular image display system includes: an image writing control part configured to write first image data sequentially in image storage parts by switching of the image storage parts, the first image data being generated by an in-vehicle first application that operates under the control of a first operating system; an image reading control part configured to read the first image data stored in the image storage parts sequentially by switching of the image storage parts; a display data generation part configured to generate display data by combining the first image data read by the image reading control part and second image data generated by an in-vehicle second application, the in-vehicle second application operating under a control of a second operating system with higher reliability than the first operating system; an error detection part configured to check the first image data stored in the image storage parts for errors; and a switching control part configured to suspend the switching of the image storage parts by the image writing control part and the switching of the image storage parts by the image reading control part, when an error is detected in the first image data by the error detection part.

According to the above configuration, when an error occurs in image data that are generated by an in-vehicle application that operates under the control of the operating system with relatively lower reliability, the switching of image storage parts by an image writing control part and an image reading control part is suspended. Thereafter, normal image data that have been written before the detection of the error are read by the image reading control part. This prevents image data that are distorted because of the occurrence of the error from being overlaid with image data that are generated by the in-vehicle application that operates under the control of the operating system with relatively higher reliability, and enables image data that are generated by the in-vehicle application that operates under the control of the operating system with relatively higher reliability to be continuously displayed.

In the first aspect, the switching control part may be configured to restart the switching of the image storage parts by the image writing control part and the switching of the image storage parts by the image reading control part, when the error in the first image data disappears.

According to the above configuration, when the error in the image data that are generated by the in-vehicle application that operates under the control of the operating system with relatively lower reliability disappears, the switching of the image storage parts by the image writing control part and the image reading control part is restarted. Thus, the latest image data that are normalized by the disappearance of the error can be displayed following normal image data that have been generated before the detection of the error.

In the first aspect, the error detection part may have an error counter that counts the number of times of the errors, and the switching control part may be configured to reset the first operating system when a value of the error counter reaches a first predetermined value.

According to the above configuration, it is determined that the in-vehicle application that operates under the control of the operating system with relatively lower reliability is in an abnormal operating condition and the operating system is reset when the number of times that the error in the image data is detected in a row reaches a predetermined value. This helps to avoid a situation in which the image data that are generated by the in-vehicle application that operates under the control of the operating system with relatively lower reliability are not updated over a long period of time.

In the above aspect, the switching control part may have a reset timer that measures elapsed time after a start of a reset of the first operating system, and the switching control part may be configured to suspend the reading of the first image data by the image reading control part when the detection of the error in the first image data by the error detection part is not terminated when a value of the reset timer reaches a second predetermined value.

According to the above configuration, the reading of image data is temporarily suspended until the image data are normalized as a result of a reset of the operating system when it takes a relatively long time to reset the operating system. This helps to avoid a situation in which image data with reduced information freshness are output to the display device for display thereon.

In the first aspect, the image writing control part and the image reading control part may be configured to perform the switching of the image storage parts on an image frame-by image frame basis.

According to the above configuration, the switching of the image storage parts in each image frame enables precise detection of occurrence of an error in the image data for each image frame. Thus, even if an error occurs in image data, the original function, the overlaid display of image data that are generated by the in-vehicle application that operates under the control of the operating system with relatively lower reliability and image data that are generated by the in-vehicle application that operates under the control of the operating system with relatively higher reliability, can be restored early.

In the first aspect, the image reading control part may be configured to read the first image data from one of the image storage parts that contains the latest first image data.

In the first aspect, the switching control part may be configured to suspend the switching of the image storage parts by the image writing control part and the switching of the image storage parts the image reading control part when the error is detected in the first image data by the error detection part so that the image writing control part continue to write the first image data generated by the first application in one of the image storage parts that contains the first image data with the error and the image reading control part continue to read the first image data from another one of the image storage parts that contains the first image data last generated before the detection of the error.

A second aspect of the disclosure provides a vehicular image display system configured to display image data. The image data is generated by in-vehicle applications and is displayed in an overlaid fashion on a common display device. mounted in a vehicle. The vehicular image display system includes: an electronic control unit that includes: a first computer in which an in-vehicle first application is installed, the in-vehicle first application operating under the control of a first operating system; memories that record first image data generated by the first computer; and a second computer in which an in-vehicle second application is installed, the in-vehicle second application operating under the control of a second operating system with higher reliability than the first operating system, the in-vehicle second application being configured to generate second image data. The electronic control unit is configured to write the first image data sequentially in the memories by switching of the memories, to read the first image data stored in the memories sequentially from the memories by switching of the memories, to generate display data by combining the first image data read from the memories and second image data and output the display data to the display device, and to check the first image data stored in the memories for errors and suspend the switching of the memories in which the first image data is written and of the memories from which the first image data is read when an error is detected in the first image data.

In the second aspect, the electronic control unit may be configured to restart the switching of the memories in which the first image data is written and of the memories from which the first image data is read, when the error in the first image data disappears.

In the second aspect, the electronic control unit may be configured to count the number of times of the errors and reset the first operating system when the number reaches a first predetermined value.

In the second aspect, the electronic control unit may be configured to measure elapsed time after a start of the reset of the first operating system and to suspend the reading of the first image data when the detection of the error continues when the elapsed time reaches a second predetermined value.

In the second aspect, the electronic control unit may be configured to perform the switching of the memories on an image frame-by-image frame basis.

In the second aspect, the electronic control unit may be configured to read the first image data from one of the memories that contains the latest first image data.

In the second aspect, the electronic control unit may be configured to suspend the switching of the memories in which the first image data is written and of the memories from which the first image data is read when the error is detected so that the first image data is continuously written in the one of the memories that contains the first image data with the error and the first image data is continuously read from another one of the memories that contains the first image data last generated before the detection of the error.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One embodiment of a vehicular image display system is described below. The vehicular image display system of this embodiment is configured to display image data that are generated by at least two image display applications that operate under the control of operating systems with different reliability from each other on a common display device that is mounted in a vehicle in an overlaid fashion. In this system, image data that are generated by an image display application that operates under the control of an operating system with relatively lower reliability are written alternately in two frame memories, and the image data are alternately read from these frame memories. The image data that are written in the frame memories are checked in each time, and the switching of the frame memories as the destinations of image data to be written and the switching of the frame memories as the sources of image data to be read are suspended when an error is detected. This prevents the image data with an error from being read from the frame memory in question and enables normal image data that have been written before the error occurred to be read from the other frame memory. Then, display data that will be output to the display device for display thereon are generated by combining the thus read normal image data with image data that are generated by the image display application that operates under the control of the operating system with relatively higher reliability.

Figure 1:
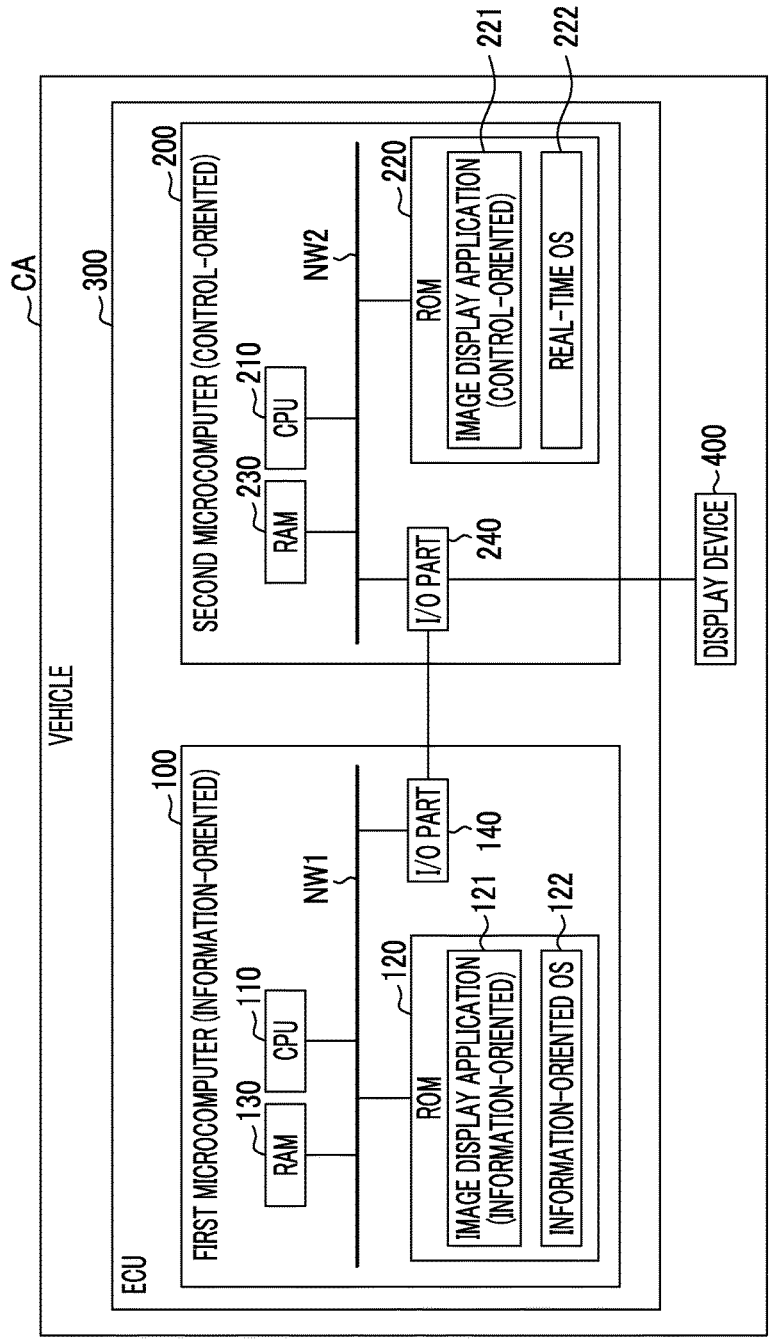
FIG. 1 is a block diagram that illustrates a general configuration of one embodiment of a vehicular image display system.

First, the configuration of the vehicular image display system of this embodiment is described with reference to a drawing. As shown in FIG. 1, a vehicle CA is equipped with an electronic control unit (ECU) 300 that includes two, first and second microcomputers 100 and 200. The first microcomputer 100 controls the display of information-oriented images through, for example, a car navigation system that displays images relating to routing assistance for the vehicle or an agent system that provides information by means of image display through interaction with the driver. The second microcomputer 200 controls the display of control-oriented images that are directly involved in the traveling of the vehicle, such as that of a speed meter.

In the microcomputer 100, a CPU 110, a ROM 120, a RAM 130 and an input-output port part (I/O part) 140 are connected to one another via a communication bus NW1. In the microcomputer 200, a CPU 210, a ROM 220, a RAM 230 and an I/O part 240 are connected to one another via a communication bus NW2.

The CPU 110 controls the operation of the entire microcomputer 100 by executing various programs that are stored in the ROM 120, and the CPU 210 controls the operation of the entire microcomputer 200 by executing various programs that are stored in the ROM 220. As one type of such programs, an information-oriented image display application 121 is stored in the ROM 120 of the first microcomputer 100 whereas a control-oriented image display application 221 is stored in the ROM 220 of the second microcomputer 200. The RAM 130 serves as a working memory for the CPU 110 in which the programs and data that are stored in the ROM 120 are expanded. The RAM 230 serves as a working memory for the CPU 210 in which the programs and data that are stored in the ROM 220 are expanded.

In the ROM 120, an operating system (OS) that controls the operation of the image display application 121 is stored in addition to the image display application 121 as described above. In the ROM 220, an OS that controls the operation of the image display application 221 is stored in addition to the image display application 221 as described above. As one type of such OSs, an information-oriented OS 122 from an open source that has high versatility but relatively lower reliability, such as Automotive Grade Linux (AGL (trademark: Linux)), is stored in the ROM 120 of the first microcomputer 100 whereas a real-time OS 222 that is dedicated for devices and has relatively higher reliability is stored in the ROM 220 of the second microcomputer 200.

The I/O parts 140 and 240 connect between the first microcomputer 100 and the second microcomputer 200. The I/O parts 140 and 240 relay various information between the microcomputers 100 and 200, such as transmitting image data that are generated by the information-oriented image display application 121 from the first microcomputer 100 to the second microcomputer 200. The I/O part 240 of the second microcomputer 200 is also connected to a display device 400, such as a head-up display device, that integrates and displays various information that is necessary in driving the vehicle. The second microcomputer 200 combines the information-oriented image data that are sent from the first microcomputer 100 and the control-oriented image data that are generated by the image display application 221 in the second microcomputer 200 and outputs the combined data to the display device 400 for display thereon as described above.

Figure 2:
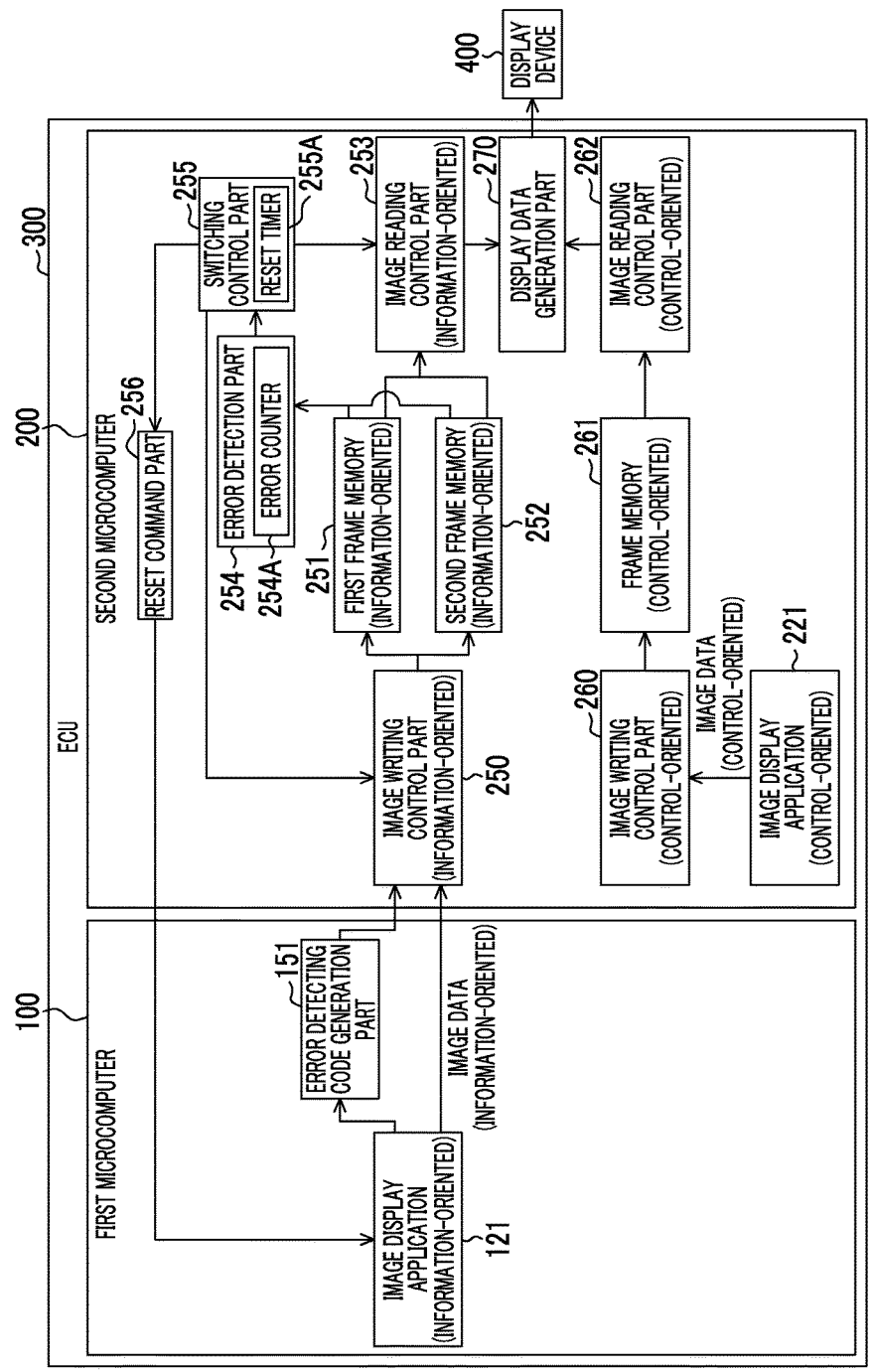
FIG. 2 is a block diagram that illustrates a functional configuration of the vehicular image display system of the embodiment.

The functional configuration of the vehicular image display system of this embodiment is next described. As shown in FIG. 2, the first microcomputer 100 transmits information-oriented image data that are generated by the image display application 121 to an image writing control part 250 of the second microcomputer 200. At this time, an error detecting code that is generated by an error detecting code generation part 151 of the first microcomputer 100 is attached to the information-oriented image data. The error detecting code is a code that is used in determining whether or not the image data includes an error. Examples of usable detection methods include check sum data methods, parity bit methods, Block Check Character (BCC) methods and Cyclic Redundancy Check (CRC) methods.

The image writing control part 250 writes the information-oriented image data that are generated by the image display application 121 alternately in a first frame memory 251 and a second frame memory 252 on an image frame-by-image frame basis together with the error detecting code. The image data that have been written in the frame memories 251 and 252 are read alternately therefrom on an image frame-by-image frame basis and output to a display data generation part 270 by an image reading control part 253.

In the second microcomputer 200, control-oriented image data that are generated by the image display application 221 are output to an image writing control part 260, from which the control-oriented image data are written in a frame memory 261. In this case, the information-oriented image data are written in at least two frame memories, the frame memories 251 and 252, as described above whereas the control-oriented image data are written in only one frame memory, the frame memory 261. Thus, the image writing control part 250 does not perform switching of the frame memory 261 as the destination of control-oriented image data to be written in contrast to the case of information-oriented image data. Then, the image data that have been thus written in the frame memory 261 are read therefrom on an image frame-by-image frame basis and output to the display data generation part 270 by an image reading control part 262.

The display data generation part 270 combines the information-oriented image data that are input from the image reading control part 253 and the control-oriented image data that are input from the image reading control part 262 to generate display data. More specifically, the display data generation part 270 expands each piece of image data into a planar pixel data group to generate a screen layer, and overlays the screen layers on top of each other to generate display data. As a result, display data that display the information-oriented image data that are generated by the image display application 121 and the control-oriented image data that are generated by the image display application 221 in an overlaid fashion are generated. Then, the thus generated display data are output from the display data generation part 270 to the display device 400 for display thereon.

As for the information-oriented image data, the image data that are written in each of the frame memories 251 and 252 are checked for errors by an error detection part 254 with reference to the error detecting code that has been attached to the image data. The error detection part 254 constantly monitors the image data for errors every time image data are written in the frame memories 251 and 252 on an image frame-by-image frame basis. Then, when an error is detected in the image data, the error detection part 254 outputs a detection signal that indicates the fact to a switching control part 255. The switching control part 255 chooses the destination of image data to be written by the image writing control part 250 between the frame memories 251 and 252 and chooses the source of image data to be read by the image reading control part 253 between the frame memories 251 and 252 upon receiving a detection signal from the error detection part 254. In other words, when an error is detected in the image data by the error detection part 254, the switching control part 255 suspends the switching of the frame memories 251 and 252 by the image writing control part 250 and the image reading control part 253. In addition, when the detection of the error in the image data by the error detection part 254 is terminated, the switching control part 255 restarts the switching of the frame memories 251 and 252 by the image writing control part 250 and the image reading control part 253.

Figure 3:
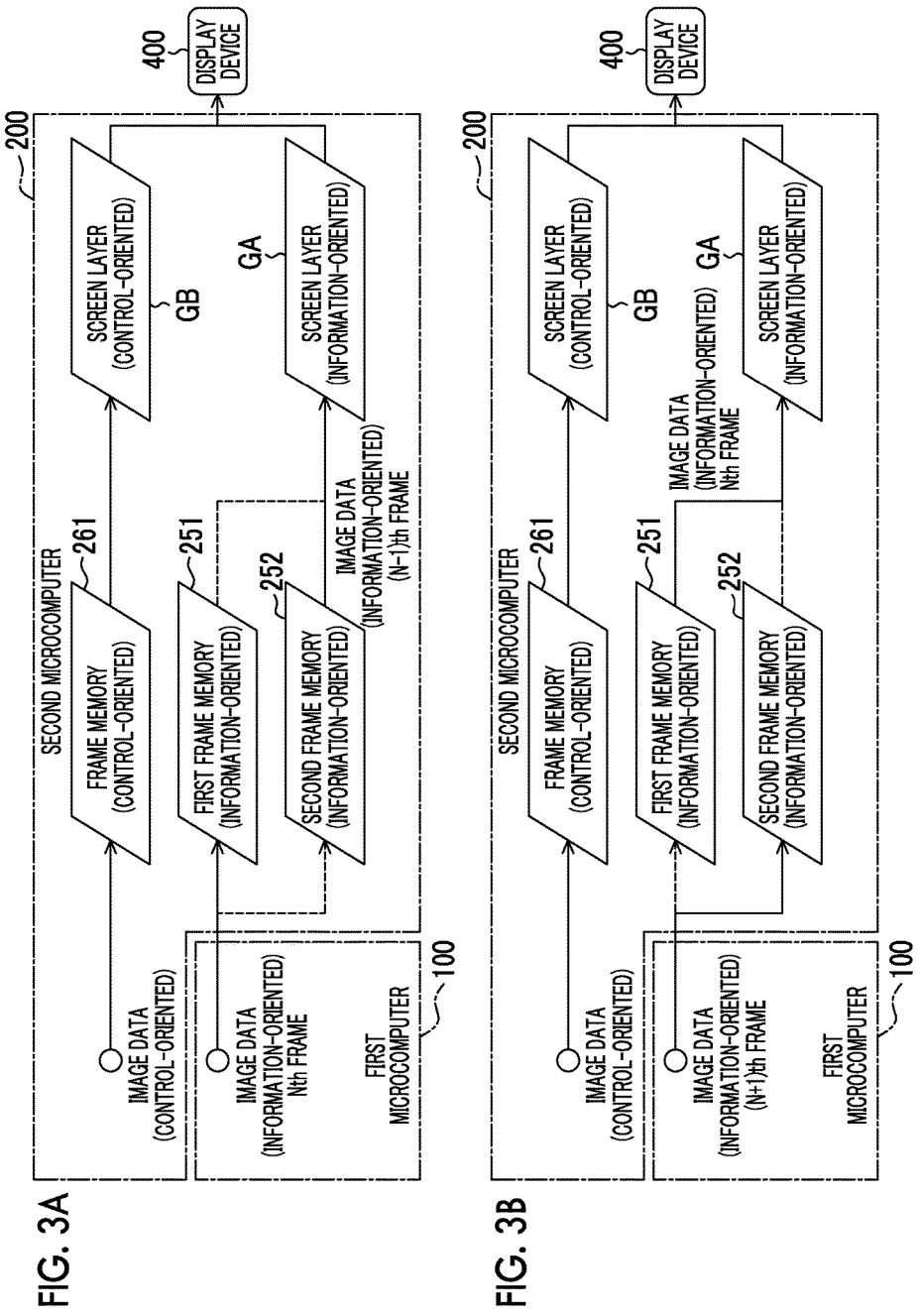
FIG. 3A is a diagram that illustrates the flow of image data signals in a normal condition.
FIG. 3B is a diagram that illustrates the flow of image data signals in a normal condition.

Specifically, in a normal condition where no error is present in image data, when an Nth image frame is input into the second microcomputer 200 from the first microcomputer 100 as information-oriented image data, the image frame is written in the first frame memory 251 as shown in FIG. 3A. On the other hand, an (N−1)th image frame, the image frame that has been written one step prior to the current step, is read from the second frame memory 252 to form a screen layer GA. Then, the display data that are created by overlaying the screen layer GA with a screen layer GB that is formed from the control-oriented image data that are read from the frame memory 261 on top of each other are output to the display device 400 for display thereon.

Then, when an (N+1)th image frame is input into the second microcomputer 200 from the first microcomputer 100 as information-oriented image data, the image frame is written in the second frame memory 252 as shown in FIG. 3B. On the other hand, the Nth image frame, the image frame that has been written one step prior to the current step as shown in FIG. 3A, is read from the first frame memory 251 to form a screen layer GA that is output to the display device 400 for display thereon.

Thereafter, as shown in FIG. 3A and FIG. 3B, the destination of image data to be written and the source of image data to be read are switched alternately between the frame memories 251 and 252, and display data that are obtained by combining the read image data with control-oriented image data are output to the display device 400 for display thereon.

Figure 4:
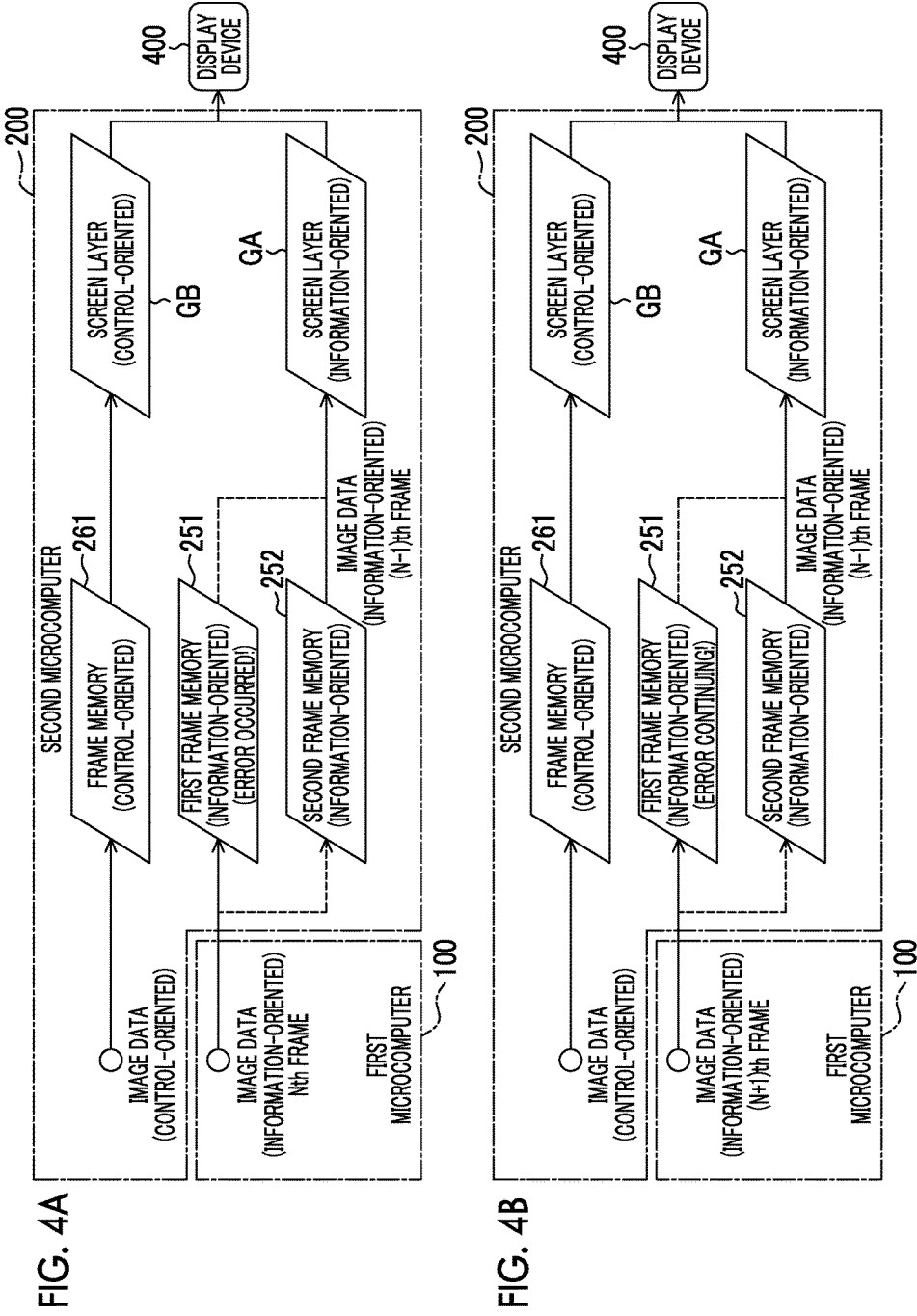
FIG. 4A is a diagram that illustrates the flow of image data signals in the event of an error.
FIG. 4B is a diagram that illustrates the flow of image data signals in the event of an error.

In contrast to this, when an error occurs in the information-oriented image data, an Nth image frame that includes the error is written in the first frame memory 251 as shown in FIG. 4A. On the other hand, an (N−1)th image frame, a normal image frame that has been written one step prior to the current step, is read from the second frame memory 252 to form a screen layer GA that is output to the display device 400 for display thereon. At this time, the error in the image frame that is written in the first frame memory 251 is detected. Then, the first frame memory 251 is used only as the destination of image frame to be written and the second frame memory 252 is used only as the source of image frame to be read until the error in the image data disappears.

Then, when an (N+1)th image frame is input into the second microcomputer 200 from the first microcomputer 100 as information-oriented image data as shown in FIG. 4B, the image frame replaces and updates the Nth image frame, the image frame that has been written one step prior to the current step as shown in FIG. 4A, in the first frame memory 251. On the other hand, the (N−1)th image frame, the image frame that has been written one step prior to the step that is shown in FIG. 4A, i.e., a normal image frame that has been written before the occurrence of the error in the image data, is read from the second frame memory 252 to form a screen layer GA that is output to the display device 400 for display thereon. It should be noted that, in the example that is shown in FIG. 4B, the error still remains present in the replaced and updated image frame. Thus, the first frame memory 251 is continuously used only as the destination of image data to be written and the second frame memory 252 is also continuously used only as the source of image data to be read.

Figure 5:
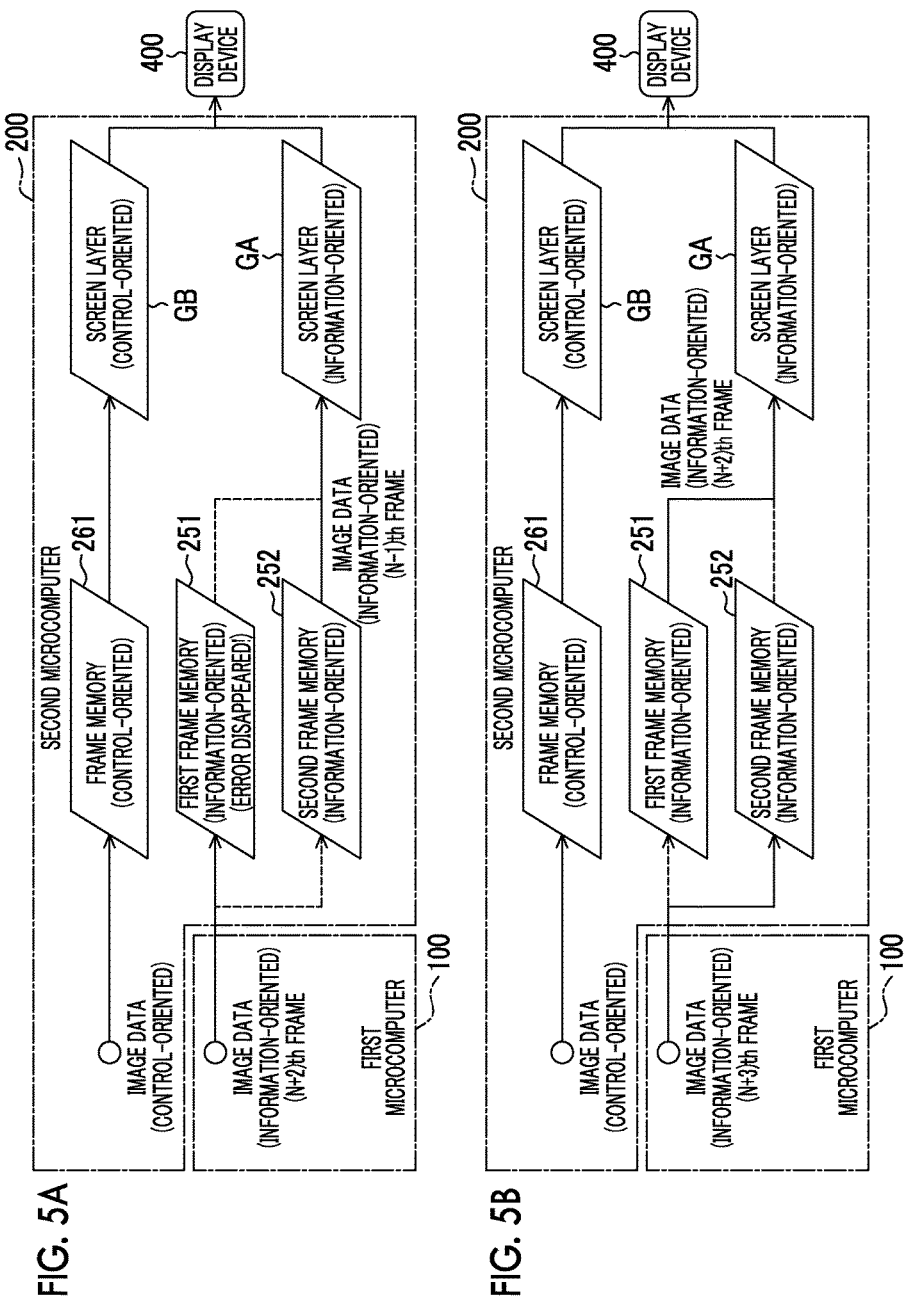
FIG. 5A is a diagram that illustrates the flow of image data signals in the event of an error.
FIG. 5B is a diagram that illustrates the flow of image data signals in the event of an error.

Then, when an (N+2)th image frame is input into the second microcomputer 200 from the first microcomputer 100 as information-oriented image data as shown in FIG. 5A, the image frame replaces and updates the (N+1)th image frame, the image frame that has been written one step prior to the current step as shown in FIG. 4B, in the first frame memory 251. On the other hand, the (N−1)th image frame, the image frame that has been written one step prior to the step that is shown in FIG. 4A, i.e., a normal image frame that has been written before the occurrence of the error in the image data, is read from the second frame memory 252 to form a screen layer GA that is output to the display device 400 for display thereon. It should be noted that, in the example that is shown in FIG. 5A, no error is detected in the replaced and updated image frame. Thus, the use of the frame memory 251 only as the destination of image data to be written is canceled and the use of the frame memory 252 only as the source of image data to be read is also canceled.

Then, when an (N+3)th image frame is input into the second microcomputer 200 from the first microcomputer 100 as information-oriented image data, the image frame is written in the second frame memory 252 as shown in FIG. 5B. On the other hand, the (N+2)th image frame, the latest image frame free of error that has been written one step prior to the current step as shown in FIG. 5A, is read from the first frame memory 251 to form a screen layer GA that is output to the display device 400 for display thereon.

Thereafter, as shown in FIG. 3A and FIG. 3B, the destination of image data to be written and the source of image data to be read are switched alternately between the frame memories 251 and 252, and display data that are obtained by combining the read image data with control-oriented image data are output to the display device 400 for display thereon.

As shown in FIG. 2, the error detection part 254 has an error counter 254A that counts the number of times of errors in image data. After the first detection of an error in image data, the error detection part 254 checks the updated image data for the error every time the image data in the frame memories 251 and 252 are replaced and updated by the image writing control part 250 with the latest image data that are sent from the image display application 121 and cumulatively increments the value of the error counter 254A every time the error is detected. In other words, the value of the error counter 254A of the error detection part 254 represents the elapsed time after an occurrence of an error in image data. Then, when the value of the error counter 254A reaches a predetermined value, the error detection part 254 determines that the error in the image data is caused not by a temporary error in transmitting image data, for example, but by an abnormal operation of the image display application 121 and outputs a warning signal to the switching control part 255.

Upon receiving a warning signal from the error detection part 254, the switching control part 255 outputs a drive signal to a reset command part 256. Then, a reset command is sent from the reset command part 256 to the first microcomputer 100 to start an operation to reset the information-oriented OS 122. Then, when the operation to reset the information-oriented OS 122 is started, the image display application 121 is also initialized and normal image data are again input into the second microcomputer 200 from the first microcomputer 100. Then, when the image data that includes the error is replaced and updated with the normal image data, the detection of the error in the image data by the error detection part 254 is terminated. Then, the switching control part 255 cancels the suspension of switching of the frame memories 251 and 252 by the image writing control part 250 and the image reading control part 253. At this time, the error detection part 254 also resets the value of the error counter 254A. Thereafter, the switching control part 255 carries out the alternate switching of the destination of image data to be written and the source of image data to be read between the frame memories 251 and 252 on an image frame-by-image frame basis until a new error is detected in image data by the error detection part 254.

The switching control part 255 has a reset timer 255A that measures the elapsed time after an operation to reset the information-oriented OS 122 is started. The switching control part 255 cumulatively increments the value of the reset timer 255A as time advances from the point of time when a drive signal is output to the reset command part 256. At this time, the switching control part 255 stops the counting by the reset timer 255A and resets the reset timer 255A to "0" when the detection of the error in the image data by the error detection part 254 is terminated with the initiation of the image display application 122. In other words, the value of the reset timer 255A of the switching control part 255 represents the period of time that has been spent in the operation to reset the information-oriented OS 122. The switching control part 255 determines that it will take a relatively long period of time to complete the operation to reset the information-oriented OS 122 when the value of the reset timer 255A reaches a predetermined value, and temporarily suspends the reading of image data from the frame memories 251 and 252 by the image reading control part 253 until the detection of the error in the image data by the error detection part 254 is terminated. This prevents a situation in which image data that have reduced information freshness are output from the image reading control part 253 to the display device 400 for display thereon.

Figure 6:
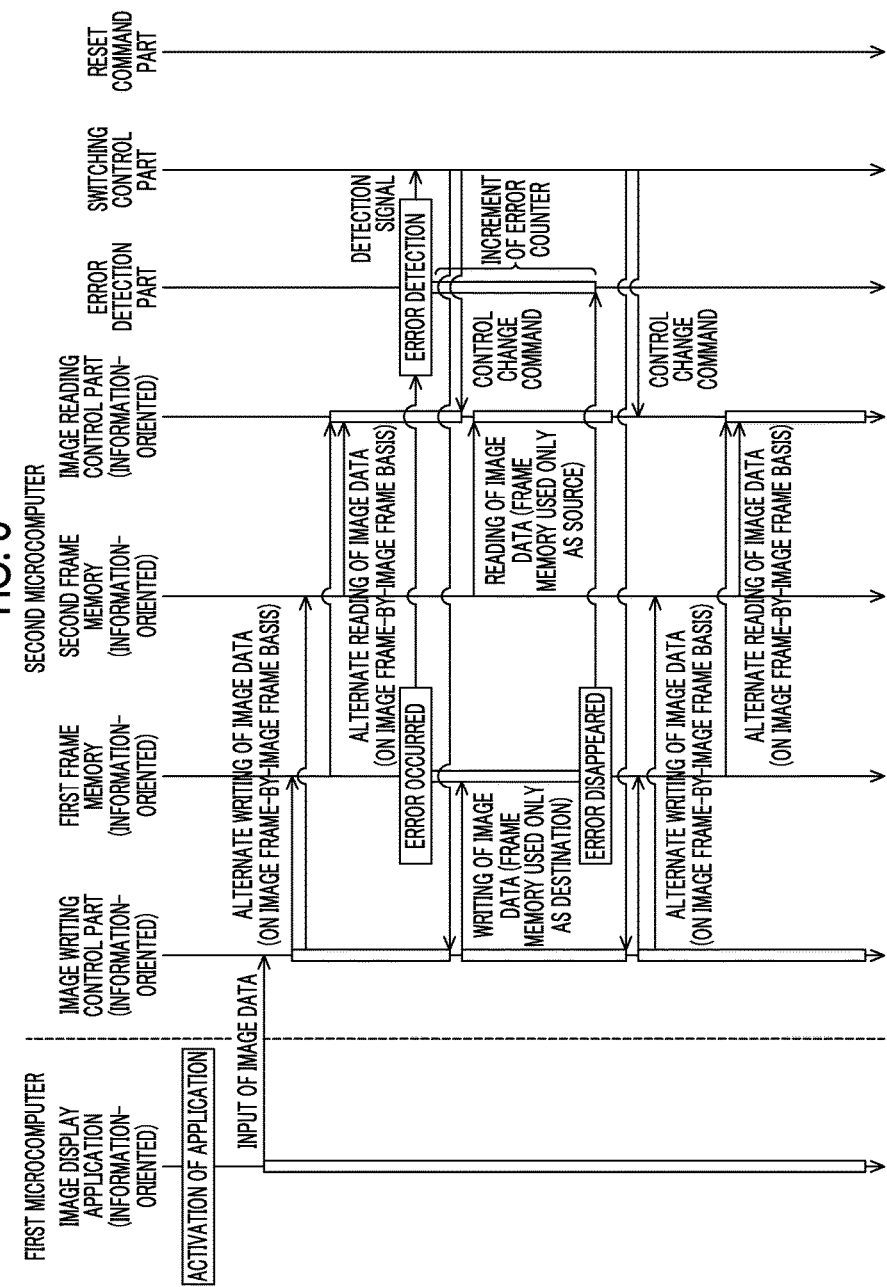
FIG. 6 is a sequence chart that illustrates the flow of information at a time when the vehicular image display system of the embodiment performs image display processing.
Figure 7:
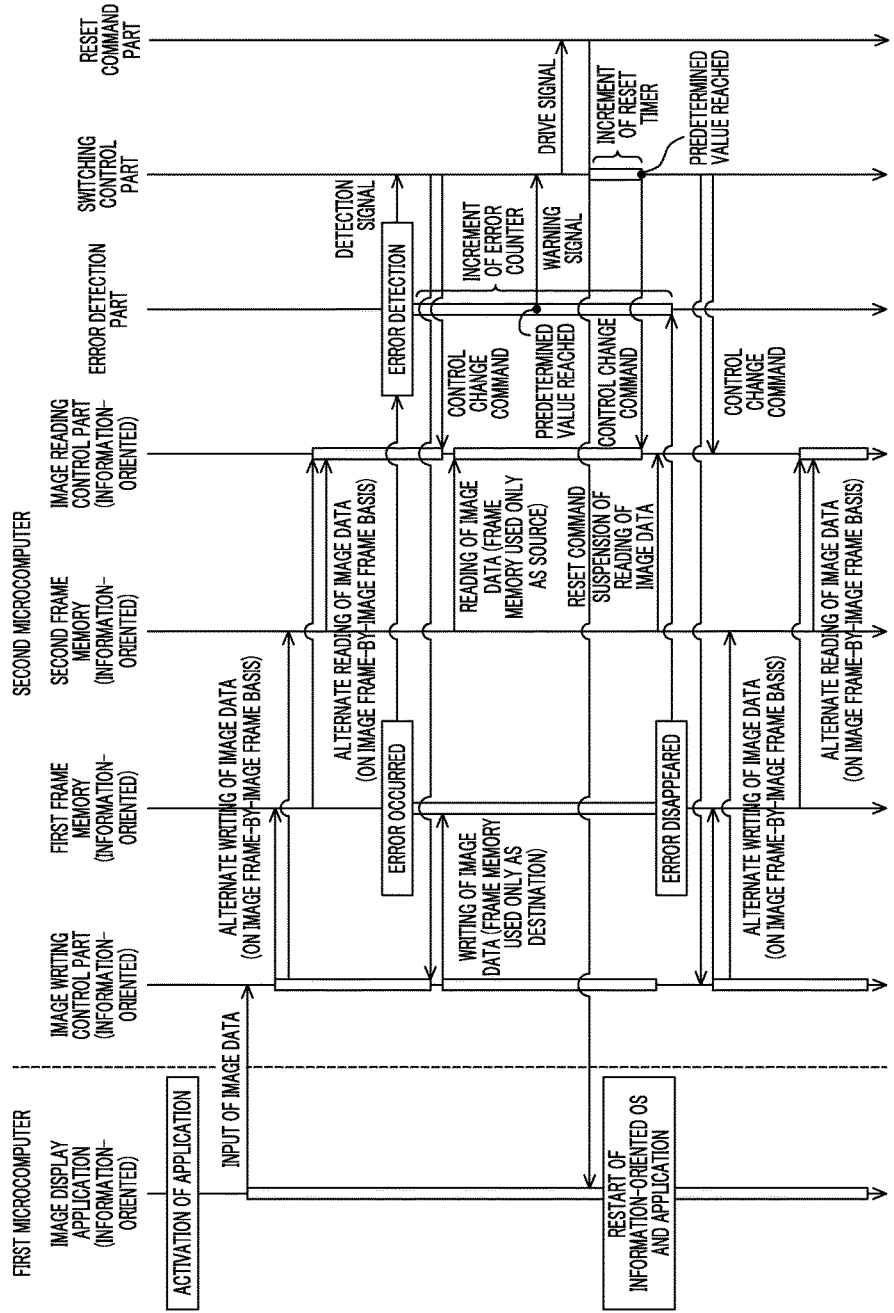
FIG. 7 is a sequence chart that illustrates the flow of information at a time when the vehicular image display system of the embodiment performs image display processing.

The operation of the vehicular image display system of this embodiment, in particular, the flow of image display processing that is executed to display information-oriented image data and control-oriented image data in an overlaid fashion, is described with reference to sequence charts in FIG. 6 and FIG. 7. FIG. 6 shows an example of a sequence chart in a case where an error in the image data disappears before the value of the error counter 254A of the error detection part 254 reaches a predetermined value, and FIG. 7 shows an example of a sequence chart in a case where the value of the error counter 254A of the error detection part 254 reaches a predetermined value before an error in the image data disappears.

As shown in FIG. 6, in this image display processing, information-oriented image data are first generated and input into the image writing control part 250 upon activation of the image display application 121. The image writing control part 250 writes the input image data alternately in the first frame memory 251 and the second frame memory 252 on an image frame-by-image frame basis. The image reading control part 253 reads the image data that have been written in the frame memories 251 and 252 alternately therefrom on an image frame-by-image frame basis.

Here, when the image data that are written in the first frame memory 251 by the image writing control part 250 includes an error, the error is detected by the error detection part 254, and a detection signal is output from the error detection part 254 to the switching control part 255. The input of the detection signal from the error detection part 254 serves as a trigger for the switching control part 255 to transmit a control change command to the image writing control part 250 and the image reading control part 253. Then, the image writing control part 250 uses the first frame memory 251 only as the destination of image data to be written and the image reading control part 253 uses the second frame memory 252 only as the source of image data to be read.

Then, the detection of the error in the image data by the error detection part 254 is continued until the error disappears in the replaced and updated image data in the first frame memory 251. At this time, the error detection part 254 cumulatively increments the value of the error counter 254A every time the error is detected in the image data. In the example that is shown in FIG. 6, the error disappears in the replaced and updated image data in the first frame memory 251 before the value of the error counter 254A of the error detection part 254 reaches a predetermined value as described above. When the error in the image data disappears in this way, the detection of the error in the image data by the error detection part 254 is naturally terminated. As a result, the switching control part 255 transmits a control change command to the image writing control part 250 and the image reading control part 253.

Thereafter, the image writing control part 250 cancels the use of the frame memory only as the destination of image data to be written and writes the latest image data that are input from the image display application 121 alternately in the first frame memory 251 and the second frame memory 252 on an image frame-by-image frame basis. In addition, the image reading control part 253 cancels the use of the frame memory only as the source of image data to be read and reads the image data that have been written in the frame memories 251 and 252 alternately therefrom on an image frame-by-image frame basis.

In contrast to this, in the example that is shown in FIG. 7, the value of the error counter 254A of the error detection part 254 reaches a predetermined value before the error in the image data disappears as described above. When the value of the error counter 254A of the error detection part 254 reaches the predetermined value in this way, the error detection part 254 outputs a warning signal to the switching control part 255. The input of the warning signal from the error detection part 254 serves as a trigger for the switching control part 255 to output a drive signal to the reset command part 256. Then, a reset command is sent from the reset command part 256 to the information-oriented OS 122 to restart the information-oriented OS 122 and the image display application 121.

The switching control part 255 starts counting with the reset timer 255A simultaneously with the output of the drive signal to the reset command part 256. Then, the switching control part 255 transmits a control change command to the image reading control part 253 when the value of the reset timer 255A reaches a predetermined value. This causes the image reading control part 253 to suspend the reading of image data from the second frame memory 252 temporarily.

Thereafter, when the error disappears in the replaced and updated image data in the first frame memory 251 with the restart of the image display application 121, the image writing control part 250 writes the latest image data that are input from the image display application 121 alternately in the first frame memory 251 and the second frame memory 252 on an image frame-by-image frame basis. The image reading control part 253 reads the image data that have been written in the frame memories 251 and 252 alternately therefrom on an image frame-by-image frame basis.

As described above, according to this embodiment, the following effects can be achieved. (1) The switching control part 255 is configured to suspend the switching of the frame memories 251 and 252 by the image writing control part 250 and the image reading control part 253 when an error occurs in image data that are generated by the image display application 121, which operates under the control of the information-oriented OS 122 with relatively lower reliability and the error is detected by the error detection part 254. Then, normal image data that have been written before the detection of the error is read by the image reading control part 253. This prevents image data that are distorted because of the occurrence of the error from being overlaid with image data that are generated by the image display application 221, which operates under the control of the real-time OS 222 with relatively higher reliability, and enables image data that are generated by the image display application 221 to be continuously displayed.

(2) The switching control part 255 is configured to restart the switching of the frame memories 251 and 252 by the image writing control part 250 and the image reading control part 253 when the error in the image data disappears. This enables the latest image data that have been normalized with the disappearance of error to be output to the display device 400 for display thereon following normal image data that have been generated before the detection of the error.

(3) The switching control part 255 is configured to reset the information-oriented OS 122 with relatively lower reliability when the value of the error counter 254A of the error detection part 254 reaches a predetermined value. This helps to avoid a situation in which the image data that are generated by the image display application 121 are not updated over a long period of time because of any abnormal operation of the image display application 121, which operates under the control of the information-oriented OS 122.

(4) The switching control part 255 is configured to suspend the reading by the image reading control part 253 of image data that are generated by the image display application 121 with relatively lower reliability when the detection of the error in the image data by the error detection part 254 is not terminated even after the value of the reset timer 255A reaches a predetermined value. In other words, when it takes a relatively long time to reset the information-oriented OS 122, for example, the switching control part 255 temporarily suspends the reading of image data until the image data is normalized by initialization of the image display application 121. This helps to avoid a situation in which image data with reduced information freshness are output to the display device 400 for display thereon.

(5) The image writing control part 250 and the image reading control part 253 are configured to perform the switching of the frame memories 251 and 252 on an image frame-by-image frame basis. This enables precise detection of the occurrence of an error in the image data for each image frame. Thus, even if an error occurs in the image data, the original function, the overlaid display of information-oriented image data that are generated by the image display application 121, which operates under the control of the information-oriented OS 122 with relatively lower reliability, and control-oriented image data that are generated by the image display application 221, which operates under the control of the real-time OS 222 with relatively higher reliability, can be restored early.

(6) The second microcomputer 200, which runs various programs under the control of the real-time OS 222 with relatively higher reliability, is configured to function as the image writing control part 250. This enables the switching of the frame memories as the destinations of image data to be written with much higher reliability compared to the case where the first microcomputer 100, which runs various programs under the control of the information-oriented OS 122 with relatively lower reliability, functions as the image writing control part.

(7) The switching control part 255 is configured to restart the switching of the frame memories 251 and 252 by the image writing control part 250 and the image reading control part 253 without resetting the information-oriented OS 122 when the error in the image data disappears before the value of the error counter 254A of the error detection part 254 reaches a predetermined value. This helps to reduce the frequency of the operation to reset the information-oriented OS 122 and therefore enables output display of image data through the display device 400 with high real-time properties.

The above embodiment may be implemented in the following forms. In the above embodiment, the image reading control part 253 and the image writing control part 250 perform switching of the frame memories 251 and 252 on an image frame-by-image frame basis. In place of this, the image reading control part 253 and the image writing control part 250 may use a plurality of image frames as a unit for performing the switching of the frame memories 251 and 252.

In the above embodiment, the switching control part 255 is configured to suspend the reading by the image reading control part 253 of image data from the frame memories 251 and 252 temporarily when the detection of the error in the image data by the error detection part 254 is not terminated even after the value of the reset timer 255A reaches a predetermined value. However, when the information-oriented image data are image data that are less likely to lose information freshness with the passage of time, the reset timer 255A, which measures the elapsed time after an operation to reset the image display application 121 is started, may be omitted. In this case, the image reading control part 253 continuously reads the information-oriented image data until the operation to reset the image display application 121 is completed.

In the above embodiment, the switching control part 255 is configured to restart the switching of the frame memories 251 and 252 by the image writing control part 250 and the image reading control part 253 without resetting the information-oriented OS 122 when an error in the image data disappears before the value of the error counter 254A of the error detection part 254 reaches a predetermined value. In place of this, the switching control part 255 may immediately start resetting the information-oriented OS 122 when the error detection part 254 detects an error in the image data, and may restart the switching of the frame memories 251 and 252 by the image writing control part 250 and the image reading control part 253 when the operation to reset the information-oriented OS 122 is completed.

In the above embodiment, the case where the number of frame memories in which the information-oriented image data are written is two is taken as an example for description. However, the number of frame memories, which is not limited as long as at least two frame memories are provided, may be three or more.

In the above embodiment, the first microcomputer 100 and the second microcomputer 200 are included in a common ECU 300. In place of this, the microcomputers 100 and 200 may be included in different ECUs.

In the above embodiment, the combination of image data that are displayed in an overlaid fashion are that of information-oriented image data and control-oriented image data. However, the combination of image data that are displayed in an overlaid fashion is not limited to this as long as image data that are generated by at least two image display applications that operate under the control of operating systems with different reliability from each other are displayed in an overlaid fashion.

What is claimed is:

1. A vehicular image display system configured to display image data, the image data being generated by in-vehicle applications and being displayed in an overlaid fashion on a common display device mounted in a vehicle, the vehicular image display system comprising:
   an image writing control part configured to write first image data sequentially in image storage parts by switching of the image storage parts, the first image data being generated by an in-vehicle first application that operates under control of a first operating system;
   an image reading control part configured to read the first image data stored in the image storage parts sequentially by switching of the image storage parts;
   a display data generation part configured to generate display data by combining the first image data read by the image reading control part and second image data generated by an in-vehicle second application, the in-vehicle second application operating under a control of a second operating system with higher reliability than the first operating system;
   an error detection part configured to check the first image data stored in the image storage parts for errors; and
   a switching control part configured to suspend the switching of the image storage parts by the image writing control part and the switching of the image storage parts by the image reading control part, when an error is detected in the first image data by the error detection part.

2. The vehicular image display system according to claim 1,
   wherein the switching control part is configured to restart the switching of the image storage parts by the image writing control part and the switching of the image storage parts by the image reading control part, when the error in the first image data disappears.

3. The vehicular image display system according to claim 1,
   wherein the error detection part has an error counter that counts the number of times of the errors, and the switching control part is configured to reset the first operating system when a value of the error counter reaches a first predetermined value.

4. The vehicular image display system according to claim 3,
   wherein the switching control part has a reset timer that measures elapsed time after a start of a reset of the first operating system, and
   the switching control part is configured to suspend the reading of the first image data by the image reading control part when the detection of the error in the first image data by the error detection part is not terminated when a value of the reset timer reaches a second predetermined value.

5. The vehicular image display system according to claim 1,
   wherein the image writing control part and the image reading control part are configured to perform the switching of the image storage parts on an image frame-by image frame basis.

6. The vehicular image display system according to claim 1,
   wherein the image reading control part is configured to read the first image data from one of the image storage parts that contains the latest first image data.

7. The vehicular image display system according to claim 1,
   wherein the switching control part is configured to suspend the switching of the image storage parts by the image writing control part and the switching of the image storage parts by the image reading control part when the error is detected in the first image data by the error detection part so that the image writing control part continues to write the first image data generated by the first application in one of the image storage parts that contains the first image data with the error, and the image reading control part continues to read the first image data from another one of the image storage parts that contains the first image data last generated before the detection of the error.

8. A vehicular image display system configured to display image data, the image data being generated by in-vehicle applications and being displayed in an overlaid fashion on a common display device mounted in a vehicle, the vehicular image display system comprising:
   an electronic control unit that includes:
   a first computer in which an in-vehicle first application is installed, the in-vehicle first application operating under the control of a first operating system;
   memories that record first image data generated by the first computer; and
   a second computer in which an in-vehicle second application is installed, the in-vehicle second application operating under the control of a second operating system with higher reliability than the first operating system, the in-vehicle second application being configured to generate second image data,
   wherein the electronic control unit is configured to:
   write the first image data sequentially in the memories by switching of the memories;
   read the first image data stored in the memories sequentially from the memories by switching of the memories;

generate display data by combining the first image data read from the memories and the second image data;

output the display data to the display device;

check the first image data stored in the memories for errors; and suspend i) the switching of the memories in which the first image data is written and ii) the switching of the memories from which the first image data is read when an error is detected in the first image data.

9. The vehicular image display system according to claim 8, wherein the electronic control unit is configured to restart the switching of the memories in which the first image data is written and of the memories from which the first image data is read, when the error in the first image data disappears.

10. The vehicular image display system according to claim 8, wherein the electronic control unit is configured to count the number of times of the errors and reset the first operating system when the number reaches a first predetermined value.

11. The vehicular image display system according to claim 10, wherein the electronic control unit is configured to measure elapsed time after a start of the reset of the first operating system and to suspend the reading of the first image data when the detection of the error continues when the elapsed time reaches a second predetermined value.

12. The vehicular image display system according to claim 8, wherein the electronic control unit is configured to perform the switching of the memories on an image frame-by-image frame basis.

13. The vehicular image display system according to claim 8, wherein the electronic control unit is configured to read the first image data from one of the memories that contains the latest first image data.

14. The vehicular image display system according to claim 8, wherein the electronic control unit is configured to suspend the switching of the memories in which the first image data is written and of the memories from which the first image data is read when the error is detected so that the first image data continues to write in one of the memories that contains the first image data with the error and the first image data continues to read from another one of the memories that contains the first image data last generated before the detection of the error.

* * * * *